(12) United States Patent  (10) Patent No.: US 7,025,024 B2
Merz  (45) Date of Patent: Apr. 11, 2006

(54) ZERO BELT CAMSHAFT

(76) Inventor: Karl Merz, Hohenweg 14, 5734 Reinach (CH)

( * ) Notice: Subject to any disclaimer, the term of this patent is extended or adjusted under 35 U.S.C. 154(b) by 0 days.

(21) Appl. No.: 10/477,379

(22) PCT Filed: May 13, 2002

(86) PCT No.: PCT/CH02/00259

§ 371 (c)(1),
(2), (4) Date: Apr. 26, 2004

(87) PCT Pub. No.: WO02/093040

PCT Pub. Date: Nov. 21, 2002

(65) Prior Publication Data

US 2004/0173048 A1   Sep. 9, 2004

(51) Int. Cl.
*F01L 1/02* (2006.01)
(52) U.S. Cl. .................. 123/90.27; 123/90.6; 29/888.1
(58) Field of Classification Search .............. 123/90.6, 123/90.27, 90.31, 90.15, 90.16, 90.17, 90.18; 74/567, 568, 569; 29/888.1
See application file for complete search history.

(56) References Cited

U.S. PATENT DOCUMENTS

| 2,621,539 | A |   | 12/1952 | Eustis et al. |
| 5,038,450 | A | * | 8/1991 | Swars ........................ 29/421.1 |
| 5,197,351 | A | * | 3/1993 | Hishida ........................ 74/567 |
| 5,253,546 | A | * | 10/1993 | Elrod et al. .................... 74/567 |

FOREIGN PATENT DOCUMENTS

DE   4324836 A1   1/1995

\* cited by examiner

*Primary Examiner*—Thomas Denion
*Assistant Examiner*—Ching Chang
(74) *Attorney, Agent, or Firm*—Tarolli, Sundheim, Covell & Tummino L.L.P.

(57) ABSTRACT

The invention relates to a camshaft comprising a tubular shaft (1) and cams (2) which are radially disposed thereon. Said cams (2) respectively engage with the shaft in a perfect fit (1) and the free surface (1.1) of the shaft forms the base circle of the cams (2), whereby the cams (2) are respectively engaged in pocket-like recesses of the shaft (1).

7 Claims, 1 Drawing Sheet

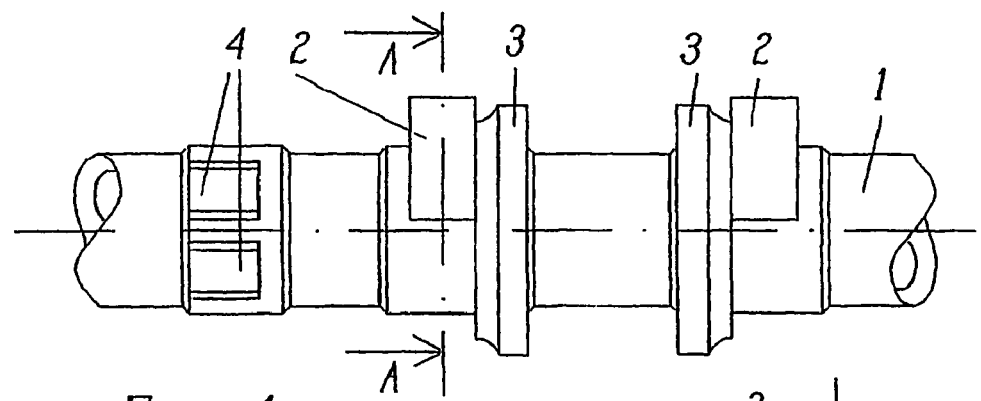
Fig. 1
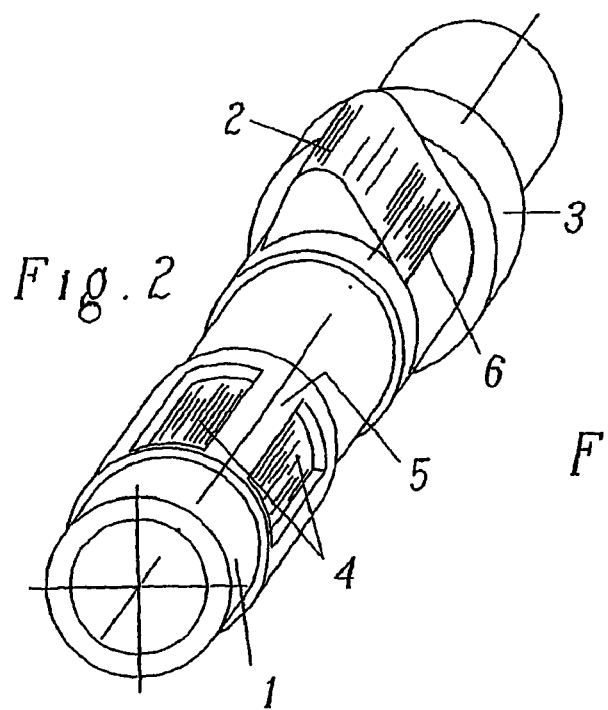
Fig. 2
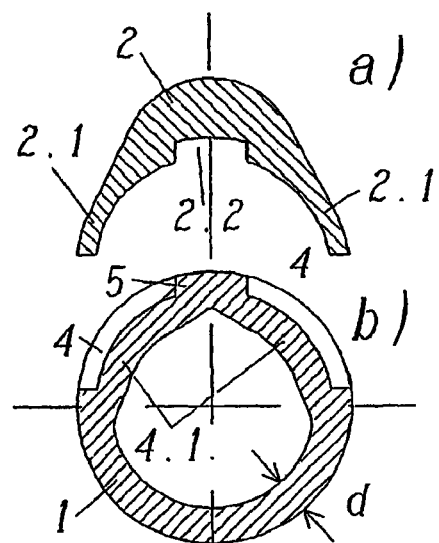
Fig. 3
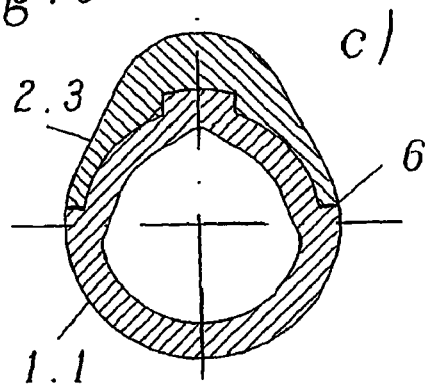

ZERO BELT CAMSHAFT

TECHNICAL FIELD

The present invention relates to a camshaft for valve timing in internal combustion engines, having a tubular shaft and having cams placed radially on the latter, the cams engaging in each case with an exact fit in the shaft, and the free shaft surface in each case forming the base circle of the cams. Camshafts of this type are also referred to as zero belt camshafts.

PRIOR ART

A camshaft of this type is disclosed in DE 43 24 836 A1. As the shaft, the known camshaft comprises a sheet-metal tube, into cutouts from which cup-like cams which are likewise premanufactured from sheet metal are inserted. In one of a number of variant embodiments, there are two cutouts in each case per cam. The known camshaft is of lightweight construction. For reasons concerned with saving weight, the shaft and cams are selected to be appropriately thin-walled. In the lifting region of the cams, there is a relatively large distance between the cams and the shaft. On account of its manner of construction, the shaft has relatively low stiffness and stability. The production of the cup-shaped sheet-metal cams is complex and expensive.

SUMMARY OF THE INVENTION

In comparison with the previously known camshaft, the camshaft provided by the invention, as characterized in the patent claims, is distinguished, above all, by greater dimensional stability and by being simpler and more cost-effective to produce. The camshaft according to the invention is likewise a zero belt camshaft.

According to claim 1, the camshaft according to the invention is characterized in that the cams engage in each case in pocket-shaped depressions of the shaft. The pocket-shaped design of the depressions means that the latter have a stabilizing base. As a result, in contrast to the previously mentioned prior art, in the region of the cams there are no recesses or cutouts in the shaft which weaken the shaft.

In a first preferred embodiment of the invention, the wall thickness of the shaft is not smaller, or at least not substantially smaller, in the region of the pocket-shaped depressions than outside these regions. This results in the shaft being particularly stable and flexurally rigid.

As already known per se from the prior art, two pocket-shaped depressions can be provided on the shaft per cam.

With further advantage, the cams are held in the pocket-shaped depressions in a form-fitting manner in the circumferential and/or axial direction of the shaft.

Furthermore, the cams can be interlocked with the shaft (in the circumferential direction of the shaft), in which case, preferably between two pocket-shaped depressions, a tooth is formed in each case on the shaft and a complementary groove is formed in each case on the cams. An interlocking structure of this type enables a large torque to be transmitted between the cams and the shaft in the circumferential direction.

The cams extend in a manner already known per se in the circumferential direction of the shaft over an angular region of less than 180°. They are preferably, however, designed as compact parts shaped by massive forming. They are particularly stable, can be subjected to high loads and also can be produced simply and cost-effectively in this form.

According to a further preferred embodiment of the invention, in the lifting region of the cams between the cams and the shaft, there is no gap or only a narrow gap in comparison with the wall thickness of the shaft and/or of the cams. This also contributes to the cams being highly stable and having high load-bearing capability.

Particularly if the cams are held by their ends in two pocket-shaped depressions in a form-fitting manner in the circumferential and/or axial direction of the shaft, and, if appropriate, are additionally interlocked with the shaft in the circumferential direction, it is sufficient merely to connect them to the shaft in the region of their two ends by welding, soldering or bonding.

According to a further preferred embodiment, the cams consist of a highly hardenable material and/or the shaft consists of a slightly hardenable material without much carburization.

The pocket-shaped depressions in the shaft can be impressed in a simple manner into the shaft from the outside or can be produced using internal high pressure while holding pressure from the outside.

BRIEF EXPLANATION OF THE FIGURES

The invention will be explained in greater detail below with reference to exemplary embodiments in conjunction with the drawing, in which:

FIG. 1 shows a section of a camshaft according to the invention which has not yet been completely fitted with cams, in a side view;

FIG. 2 likewise shows a section of a camshaft according to the invention which has likewise not yet been completely fitted with cams, in a perspective view;

FIG. 3 shows, under a), a section view (A—A in FIG. 1) of a cam according to the invention, under b), a section view of the shaft in the region in which the cam is fitted, and under c), the two parts joined together.

WAYS OF IMPLEMENTING THE INVENTION

In FIG. 1, 1 refers to a tubular shaft, 2 refers to two cams placed radially onto the shaft and 3 refers to two bearing rings. A pocket-shaped depression in the shaft 1, which is provided for the installation of a further cam (not illustrated), is referred to by 4. A corresponding, associated, pocket-shaped depression is also present on the rear side of the shaft and therefore cannot be seen. The cams 2 are also fitted by their end sections 2.1 in each case into identical pairs of depressions of this type.

Details in respect of the design of the cams 2, the pocket-shaped depressions 4 and the fitting of the cams in the pocket-shaped depressions can be taken from FIGS. 2 and 3.

It can be seen that the cams 2 are not entirely semicircular parts and tend to be somewhat v-shaped. They can be produced, for example, in a simple manner from a sheet-metal strip and/or a profiled strip by massive forming. The pocket-like depressions 4 in the shaft 1 are of approximately rectangular design and matched in respect of their size and depth to the size and to the thickness and shape of the end sections 2.1 of the cams 2. Their continuous, uninterrupted base 4.1 has approximately the same wall thickness d as the rest of the shaft 1. The wall material of the shaft 1 is simply pushed somewhat inward in the region of the depressions 4.

There are two pocket-like depressions 4 somewhat spaced apart from each other in each case per cam 2. When the cams 2 are placed onto the shaft 1, they engage with their ends 2.1 in the two pocket-like depressions 4 with the exact fit, as can be seen in FIG. 3 under c). Since the cams 2 are not of completely semicircular design, they extend on the shaft 1 over an angular region of less than 180°.

The distance between the two pocket-like depressions results in a type of tooth 5 which interacts with a groove 2.2 in the lifting region of the cams 2 when the cams 2 are placed onto the shaft 1 and engage with their ends 2.1 in the depressions 4, as can likewise be seen in FIG. 3 under c). This results in an interlocking between the shaft 1 and the cams 2 in the circumferential direction of the shaft 1, which enables a high torque to be transmitted in the circumferential direction of the shaft 1.

The shape of the cams 2, the thickness of their ends 1.2 and the depth of the pocket-shaped depressions 4 are furthermore coordinated with one another in such a manner that a continuous, stepless transition is produced in each case from the free shaft surface 1.1, which is not covered by the cams 2, to the cams 2 at both ends 2.1 of the cams 2.

By virtue of their engagement in the depressions 4 with an exact fit, the cams 2 are additionally secured in a form-fitting manner in the circumferential and in the axial direction of the shaft 1. For permanent connection of the cam 2 to the shaft 1, it is therefore sufficient merely to provide, at 6, a weld, solder or a bond which is exposed only to low loads. At least in the case of a weld, the welding bead which is produced at 6 is to be subsequently ground away in order to ensure the abovementioned, smooth transition between the free shaft surface 1.1 to the outer surface 2.3 of the cams 2.

Within the context of the construction described according to the invention, it is readily possible and preferred to design the cams 2 to be of such a thickness in their lifting region that between them and the shaft 1 there is no gap or merely a narrow gap in comparison with the wall thickness d of the shaft 1. Great stability is then achieved. In this connection, the presence of the groove 2.2 contributes to limiting the thickness of the cams 2 in their lifting region.

The shaft 1 of FIG. 1 also has an unequal diameter over its length. The diameter is greater than the region in which the cams 2 are fitted than, for example, in the bearing region between the two bearing rings 3. This structure can be produced in the same working step as the provision of the pocket-shaped depressions, in particular by use of the internal high pressure process or else by rolling.

The camshaft according to the invention is, as already mentioned, a zero belt shaft. Since the free shaft surface 1.1 in each case forms the base circle of the cams 2, the camshaft as a whole can be of very compact dimensions while being highly stable, which then also makes a more compact construction of the internal combustion engine in its entirety possible.

By means of the base of the pocket-shaped depressions, which base is arranged in each case offset radially inward toward the shaft axis in comparison to the rest of the tube wall of the shaft 1, there results a favorable distribution of mass in the region of the cams with only a slight unbalance.

LIST OF REFERENCE NUMBERS

1 Tubular shaft
1.1 Free shaft surface
2 Cams
2.1 Ends of the cams
2.2 Groove in the cams
2.3 Outer surface of the cams
3 Bearing rings
4 Pocket-shaped depressions in the shaft
4.1 Base of the pocket-shaped depressions
5 Tooth
6 Connection

The invention claimed is:

1. A camshaft having a tubular shaft and having cams placed radially on the latter, the cams engaging in each case with an exact fit in the shaft, and a free shaft surface in each case forming a base circle of the cam, wherein the cams engage in each case in two pocket-shaped depressions of the shaft, wherein the cams are held in the pocket-shaped depressions in a form-fitting manner in the circumferential and axial direction of the shaft, wherein the cams extend in the circumferential direction of the shaft over an angular region of less than 180°, and wherein the cams have two ends, and are connected to the shaft in the region of these ends by welding, soldering or bonding.

2. The camshaft as claimed in claim 1, wherein the wall thickness of the shaft is not smaller, or at least not substantially smaller, in the region of the pocket-shaped depressions than outside these regions.

3. The camshaft as claimed in claim 1, wherein the shaft and the cams are interlocked in the circumferential direction of the shaft.

4. The camshaft as claimed in claim 1, wherein between the two pocket-shaped depressions a tooth is formed in each case on the shaft and a complementary groove is formed in each case on the cams.

5. The camshaft as claimed in claim 1, wherein the cams are parts shaped by massive forming.

6. The camshaft as claimed in claim 1, wherein in the lifting region of the cams between the cams and the shaft, there is no gap or only a narrow gap in comparison with the wall thickness of the shaft.

7. The camshaft as claimed in claim 1, wherein a highly hardenable material is used for the cams and/or a slightly hardenable material is used for the shaft.

* * * * *